United States Patent
White, II et al.

(10) Patent No.: US 10,033,226 B2
(45) Date of Patent: Jul. 24, 2018

(54) METHODS AND APPARATUS FOR OUT OF PHASE FIELD MITIGATION

(71) Applicant: QUALCOMM Incorporated, San Diego, CA (US)

(72) Inventors: Mark White, II, Solana Beach, CA (US); Seong Heon Jeong, San Diego, CA (US); William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 14/975,524

(22) Filed: Dec. 18, 2015

(65) Prior Publication Data

US 2016/0329748 A1 Nov. 10, 2016

Related U.S. Application Data

(60) Provisional application No. 62/156,793, filed on May 4, 2015.

(51) Int. Cl.
*H01F 27/42* (2006.01)
*H02J 50/12* (2016.01)
(Continued)

(52) U.S. Cl.
CPC .............. *H02J 50/12* (2016.02); *H01F 38/14* (2013.01); *H02J 7/025* (2013.01); *H02J 50/20* (2016.02); *H02J 50/70* (2016.02); *H02J 50/80* (2016.02); *H02J 50/90* (2016.02); *H04B 5/0037* (2013.01); *H04B 5/0081* (2013.01);
(Continued)

(58) Field of Classification Search
CPC ............ G01R 33/3875; G01R 33/3815; A61N 2/004; A61N 2/02
See application file for complete search history.

(56) References Cited

U.S. PATENT DOCUMENTS

| 2012/0050015 | A1 | 3/2012 | Low et al. |
| 2012/0139356 | A1 | 6/2012 | Jung et al. |

(Continued)

OTHER PUBLICATIONS

STIC Search Report.*
International Search Report and Written Opinion—PCT/US2016/026037—ISA/EPO—May 27, 2016.

*Primary Examiner* — Sibin Chen
(74) *Attorney, Agent, or Firm* — Knobbe, Martens, Olson & Bear, LLP

(57) ABSTRACT

This invention describes a method and apparatus for providing wireless power. The methods and systems disclosed consist of a first coil having at least one loop forming an inner area inside boundaries of the at least one loop and an outer area outside the boundaries of the at least one loop, the first coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second phase different from the first phase. In some aspects, the methods and systems comprise a second coil comprising a portion within the outer area, the second coil configured to reduce a magnitude of the second magnetic field component.

30 Claims, 13 Drawing Sheets

(51) Int. Cl.
*H01F 38/14* (2006.01)
*H02J 7/02* (2016.01)
*H04B 5/00* (2006.01)
*H02J 50/20* (2016.01)
*H02J 50/70* (2016.01)
*H02J 50/90* (2016.01)
*H02J 50/80* (2016.01)
*H01F 27/36* (2006.01)

(52) U.S. Cl.
CPC ......... H04B 5/0093 (2013.01); *H01F 27/365* (2013.01); *H01F 27/367* (2013.01)

(56) References Cited

U.S. PATENT DOCUMENTS

| | | |
|---|---|---|
| 2012/0274521 A1* | 11/2012 | Minemura ............... H01Q 7/00 343/729 |
| 2013/0293189 A1 | 11/2013 | Low et al. |
| 2014/0125275 A1 | 5/2014 | Low et al. |
| 2014/0154980 A1 | 6/2014 | Jang et al. |
| 2014/0246916 A1 | 9/2014 | Von Novak |
| 2015/0115727 A1 | 4/2015 | Carobolante et al. |

\* cited by examiner

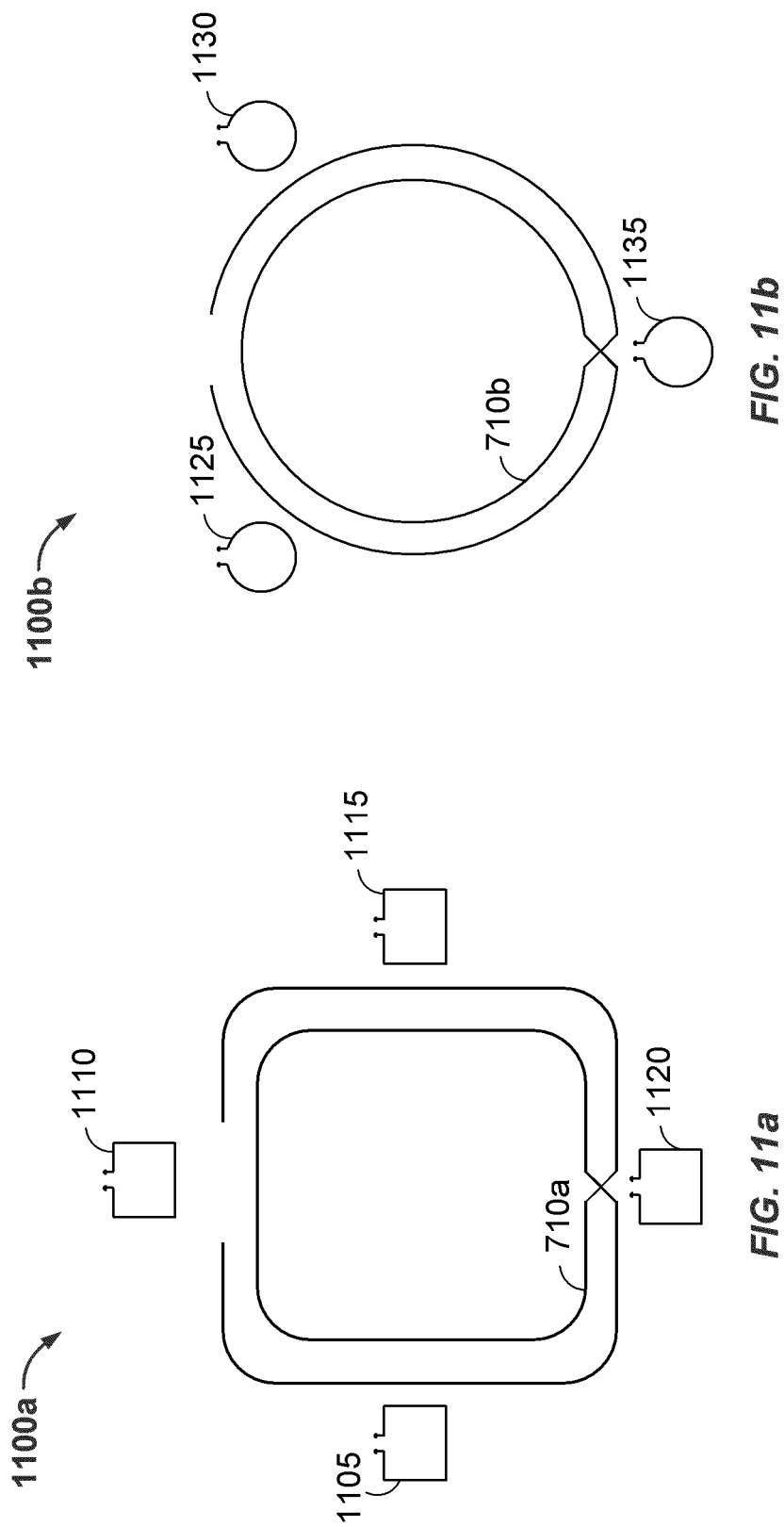

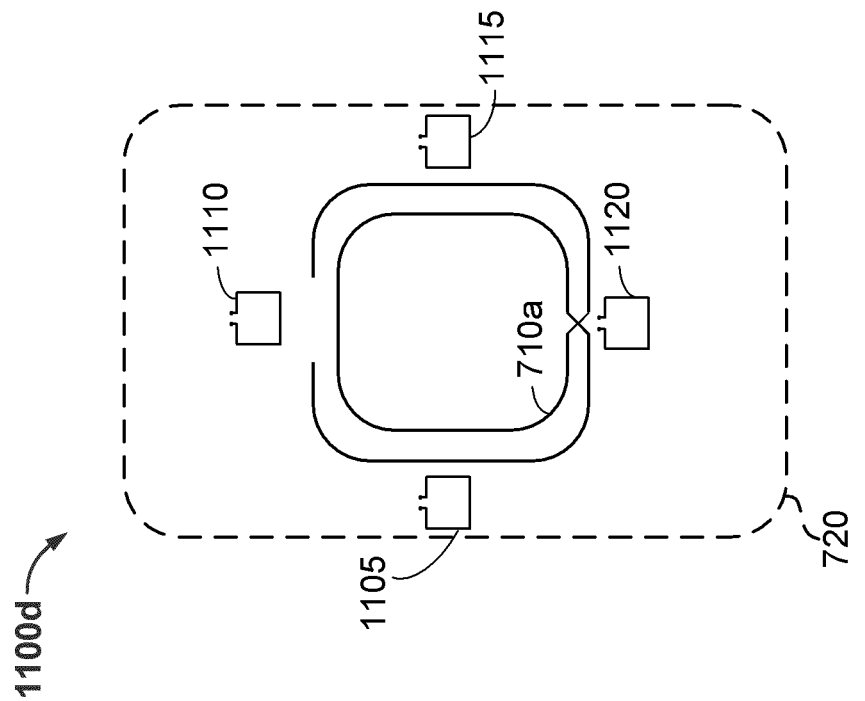
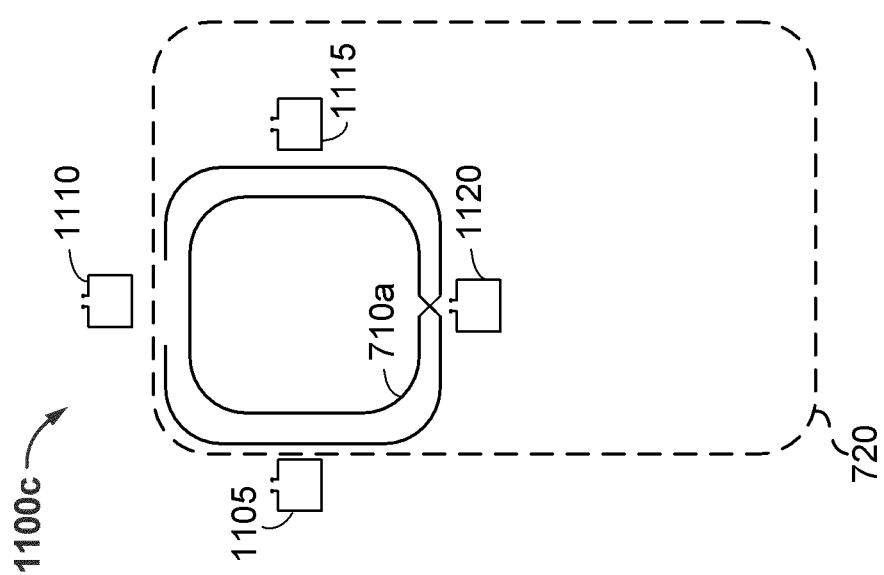

1400

1405
GENERATE, VIA A POWER TRANSMITTING COIL, A FIRST ALTERNATING MAGNETIC FIELD FOR CHARGING OR POWERING A WIRELESS POWER DEVICE, THE POWER TRANSMITTING COIL HAVING AT LEAST ONE LOOP FORMING AN INNER AREA INSIDE BOUNDARIES OF THE LOOP AND AN OUTER AREA OUTSIDE THE BOUNDARIES OF THE LOOP, THE FIRST ALTERNATING MAGNETIC FIELD HAVING A FIRST MAGNETIC COMPONENT WITH A FIRST PHASE IN THE INNER AREA, THE FIELD ALSO HAVING A SECOND MAGNETIC COMPONENT WITH A SECOND PHASE IN THE OUTER AREA, AND THE SECOND MAGNETIC PHASE DIFFERENT FROM THE FIRST MAGNETIC PHASE

1410
SHIELD, BY A METAL OR FERRITE PORTION, THE WIRELESS POWER RECEIVER DEVICE FROM THE SECOND MAGNETIC COMPONENT, THE METAL OR FERRITE PORTION SURROUNDING AT LEAST A PORTION OF THE PERIMETER OF THE POWER TRANSMITTING COIL

GENERATING, VIA A POWER TRANSMITTING COIL, A FIRST ALTERNATING MAGNETIC FIELD FOR CHARGING OR POWERING A WIRELESS POWER DEVICE, THE POWER TRANSMITTING COIL HAVING AT LEAST ONE LOOP FORMING AN INNER AREA INSIDE BOUNDARIES OF THE LOOP AND AN OUTER AREA OUTSIDE THE BOUNDARIES OF THE LOOP, THE FIRST ALTERNATING MAGNETIC FIELD HAVING A FIRST MAGNETIC COMPONENT WITH A FIRST PHASE IN THE INNER AREA, THE FIELD ALSO HAVING A SECOND MAGNETIC COMPONENT WITH A SECOND PHASE IN THE OUTER AREA, AND THE SECOND MAGNETIC PHASE DIFFERENT FROM THE FIRST MAGNETIC PHASE

1510

REDUCING, VIA A PLURALITY OF COILS POSITIONED OUTSIDE OF THE POWER TRANSMITTING COIL, THE MAGNITUDE OF THE SECOND MAGNETIC COMPONENT

*FIG. 15*

METHODS AND APPARATUS FOR OUT OF PHASE FIELD MITIGATION

CROSS REFERENCE TO PRIORITY APPLICATION

This application claims priority under 35 U.S.C. § 119(e) to U.S. Provisional Pat. App. 62/156,793 entitled "METHODS AND APPARATUS FOR OUT OF PHASE FIELD MITIGATION" filed on May 4, 2015, the disclosure of which is hereby incorporated by reference in its entirety.

TECHNICAL FIELD

The described technology generally relates to wireless power. More specifically, the disclosure is directed to devices, systems, and methods related to wireless power transfer comprising mitigating an out-of-phase effect of a field at a perimeter of a power transmitting coil.

BACKGROUND

An increasing number and variety of electronic devices are powered via rechargeable batteries. Such devices include mobile phones, electric vehicles, portable music players, laptop computers, tablet computers, computer peripheral devices, communication devices (e.g., Bluetooth devices), digital cameras, hearing aids, and the like. While battery technology has improved, battery-powered electronic devices increasingly require and consume larger amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved power and impedance measurements in wireless power systems.

One aspect of this invention includes an apparatus for providing wireless power. The apparatus comprises a power transmitting coil configured to generate a field for charging a wireless power device. The apparatus further comprises a compensating coil surrounding at least a portion of a perimeter of the power transmitting coil and configured to reduce an out-of-phase effect of the field at the perimeter of the power transmitting coil. In some aspects, the field is a magnetic field and the out-of phase effect is a reversed phase field.

Another aspect disclosed is a method for providing wireless power. The method comprises generating, via a power transmitting coil, a field for charging a wireless power device. The method further comprises reducing, via a compensating coil, an out-of-phase effect of the field at a perimeter of the power transmitting coil, the compensating coil surrounding at least a portion of the perimeter of the power transmitting coil. In some aspects, the field is a magnetic field and the out-of phase effect is a reversed phase field. In some aspects, a non-transitory computer readable medium may comprise instructions that, when executed, perform the above-described method.

Another aspect disclosed is a device for providing wireless power. The device comprises means for generating a field for charging a wireless power device. The device further comprises means for reducing an out-of-phase effect of the field at a perimeter of the means for generating, the means for reducing surrounding at least a portion of the perimeter of the means for generating. In some aspects, the field is a magnetic field and the out-of phase effect is a reversed phase field. In some aspects, the means for generating may comprise a power transmitting coil. In some aspects, the means for reducing may comprise a compensating coil.

Another aspect of the disclosure includes an apparatus for wirelessly transferring power. The apparatus comprises a first coil having at least one loop forming an inner area inside boundaries of the at least one loop and an outer area outside the boundaries of the at least one loop, the first coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second phase different from the first phase. The apparatus further comprises a second coil comprising a portion within the outer area, the second coil configured to reduce a magnitude of the second magnetic field component.

Another aspect disclosed is a method for wirelessly transferring power. The method comprises generating, via a first coil, a first alternating magnetic field for charging or powering a wireless power device, the first coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second phase different from the first phase. The method further comprises reducing, via a second coil, a magnitude of the second magnetic field component, the second coil comprising a portion within the outer area. In some aspects, a non-transitory computer readable medium may comprise instructions that, when executed, perform the above-described method.

Another aspect of the disclosure includes an apparatus for wirelessly transferring power. The apparatus comprises first means for generating a first alternating magnetic field for charging or powering a wireless power device, the first generating means having an inner area and an outer area, the first alternating magnetic field having a first magnetic field component with a first phase in the inner area, the first alternating magnetic field also having a second magnetic field component with a second phase in the outer area, and the second phase different from the first phase. The apparatus further comprises means for reducing a magnitude of the second magnetic field component.

Another aspect of the disclosure includes an apparatus for providing wireless power. The apparatus comprises a power transmitting coil having at least one loop forming an inner area inside boundaries of the at least one loop and an outer area outside the boundaries of the at least one loop, the power transmitting coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second phase different from the first phase. The apparatus further comprises a metal or ferrite portion surrounding at least a portion of a perimeter of the power transmitting coil, the metal or ferrite portion configured to shield the wireless power device from the second magnetic field component.

Another aspect disclosed is a method for providing wireless power. The method comprises generating, via a power transmitting coil, a first alternating magnetic field for charging or powering a wireless power device, the power transmitting coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second magnetic phase different from the first magnetic phase. The method further comprises shielding, by a metal or ferrite portion, the wireless power device from the second magnetic field component, the metal or ferrite portion surrounding at least a portion of the perimeter of the power transmitting coil. In some aspects, a non-transitory computer readable medium may comprise instructions that, when executed, perform the above-described method.

Another aspect of the disclosure includes an apparatus for wirelessly transferring power. The apparatus comprises first means for generating a first alternating magnetic field for charging or powering a wireless power device, the first generating means having an inner area and an outer area, the first alternating magnetic field having a first magnetic field component with a first phase in the inner area, the first alternating magnetic field also having a second magnetic field component with a second phase in the outer area, and the second phase different from the first phase. The apparatus further comprises means for shielding the wireless power receiver device from the second magnetic field component.

Yet another aspect disclosed includes an apparatus for providing wireless power. The apparatus comprises a first coil having at least one loop forming an inner area inside boundaries of the at least one loop and an outer area outside the boundaries of the at least one loop, the first coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second magnetic phase different from the first magnetic phase. The apparatus further comprises a plurality of coils positioned outside of the power transmitting coil and configured to reduce a magnitude of the second magnetic field component.

Another aspect disclosed is a method for providing wireless power. The method comprises generating, via a power transmitting coil, a first alternating magnetic field for charging or powering a wireless power device, the power transmitting coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second magnetic phase different from the first magnetic phase. The method further comprises reducing, via a plurality of coils positioned outside of the power transmitting coil, a magnitude of the second magnetic field component. In some aspects, a non-transitory computer readable medium may comprise instructions that, when executed, perform the above-described method.

Another aspect disclosed is an apparatus for providing wireless power. The apparatus comprises first means for generating a first alternating magnetic field for charging or powering a wireless power device, the first generating means having an inner area and an outer area, the first alternating magnetic field having a first magnetic field component with a first phase in the inner area, the first alternating magnetic field also having a second magnetic field component with a second phase in the outer area, and the second phase different from the first phase. The apparatus further comprises a plurality of means for reducing a magnitude of the second magnetic field component, the plurality of reducing means positioned in the outer area.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

FIG. 11a depicts a schematic diagram of an exemplary detection or mitigation system comprising a transmit coil, in accordance with an exemplary embodiment.

FIG. 11b depicts a schematic diagram of another exemplary detection or mitigation system comprising a transmit coil, in accordance with an exemplary embodiment.

FIG. 11c depicts a schematic diagram of another exemplary detection or mitigation system used in conjunction with a power receiving unit, in accordance with an exemplary embodiment.

FIG. 11d depicts a schematic diagram of another exemplary detection or mitigation system used in conjunction with a power receiving unit, in accordance with an exemplary embodiment.

FIG. 14 is a flowchart of an exemplary method of providing wireless power, in accordance with an exemplary embodiment.

FIG. 15 is a flowchart of an exemplary method of providing wireless power, in accordance with an exemplary embodiment.

DETAILED DESCRIPTION

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular implementations only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
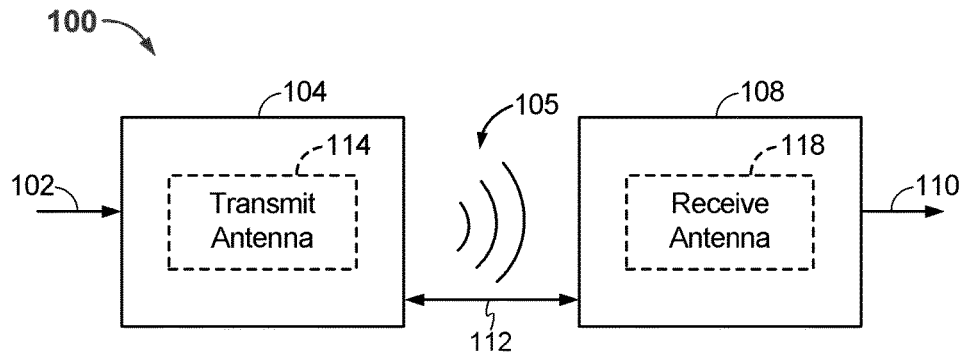
FIG. 1 is a functional block diagram of a wireless power transfer system, in accordance with an exemplary embodiment.

FIG. 1 is a functional block diagram of a wireless power transfer system 100, in accordance with one exemplary implementation. Input power 102 is provided to a transmitter 104 from a power source (not shown in this figure) to generate a wireless (e.g., magnetic or electromagnetic) field 105 for performing energy transfer. A receiver 108 couples to the wireless field 105 and generates output power 110 for storing or consumption by a device (not shown in this figure) coupled to the output power 110. Both the transmitter 104 and the receiver 108 are separated by a distance 112.

The receiver 108 may wirelessly receive power when the receiver 108 is located in the wireless field 105 generated by the transmitter 104. The transmitter 104 includes a transmit antenna or coil 114 for transmitting energy to the receiver 108 via the wireless field 105. The receiver 108 includes a receive antenna or coil 118 for receiving or capturing energy transmitted from the transmitter 104 via the wireless field 105. The wireless field 105 corresponds to a region where energy output by the transmitter 104 may be captured by the receiver 108. In some implementations, the wireless field 105 may correspond to the "near-field" of the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

In one exemplary implementation, the wireless field 105 may be a magnetic field and the transmitter 104 and the receiver 108 are configured to inductively transfer power. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are reduced. Resonant inductive coupling techniques may allow for improved efficiency and power transfer over various distances and with a variety of inductive coil configurations. When configured according to a mutual resonant relationship, in an implementation, the transmitter 104 outputs a time varying magnetic field with a frequency corresponding to the resonant frequency of the transmit coil 114. When the receiver 108 is within the wireless field 105, the time varying magnetic field may induce a current in the receive coil 118. When the receive coil 118 is configured to resonate at the frequency of the transmit coil 114, energy may be more efficiently transferred. The alternating current (AC) induced in the receive coil 118 may be rectified as described above to produce direct current (DC) that may be provided to charge or to power a load (not shown).

Figure 2:
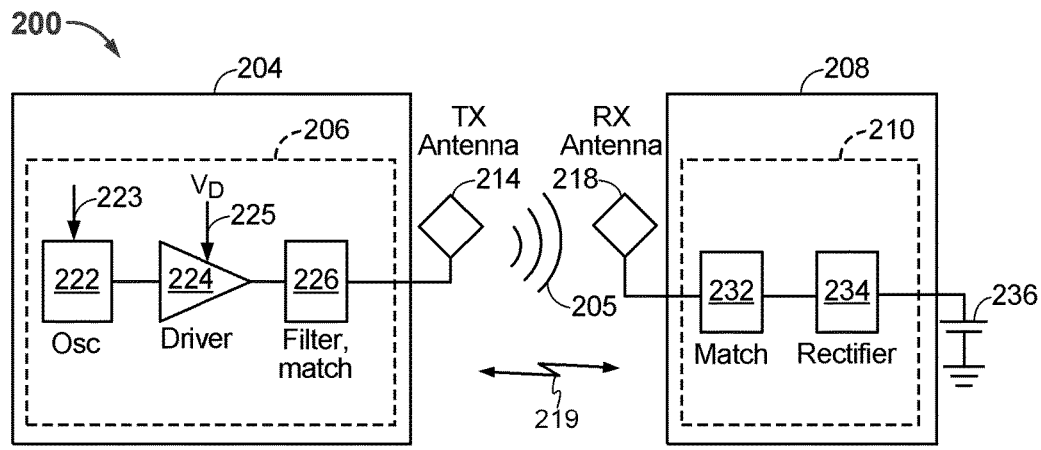
FIG. 2 is a functional block diagram of a wireless power transfer system, in accordance with an exemplary embodiment.

FIG. 2 is a functional block diagram of a wireless power transfer system 200, in accordance with an exemplary implementation. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that is adjusted in response to a frequency control signal 223. The oscillator 222 provides the oscillator signal to the driver circuit 224. The driver circuit 224 is configured to drive a transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave or square wave.

The filter and matching circuit 226 filters out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236, for example.

The receiver 208 includes receive circuitry 210 that includes a matching circuit 232 and a rectifier circuit 234. The matching circuit 232 may match the impedance of the receive circuitry 210 to a receive antenna 218. The rectifier circuit 234 may generate a direct current (DC) power output from an alternate current (AC) power input to charge a battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

Figure 3:
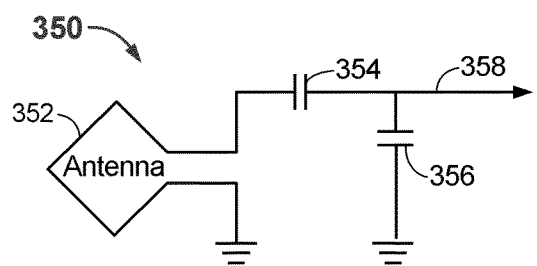
FIG. 3 is a schematic diagram of a portion of transmit circuitry or receive circuitry of FIG. 2 including a transmit or receive antenna, in accordance with an exemplary embodiment.

FIG. 3 is a schematic diagram of a portion of the transmit circuitry 206 or the receive circuitry 210 of FIG. 2, in accordance with exemplary implementations. As illustrated in FIG. 3, transmit or receive circuitry 350 includes an antenna 352. The antenna 352 may also be referred to or be configured as a "loop" antenna 352. The antenna 352 may also be referred to herein or be configured as a "magnetic" antenna or an induction coil. The term "antenna" generally refers to a component that wirelessly outputs or receives energy for coupling to another "antenna." The antenna 352 may also be referred to as a coil or inductor of a type that is configured to wirelessly output or receive power. As used herein, the antenna 352 is an example of a "power transfer component" of a type that is configured to wirelessly output and/or receive power. The antenna 352 may include an air core or a physical core such as a ferrite core (not shown in this figure).

The antenna 352 may form a portion of a resonant circuit configured to resonate at a resonant frequency. The resonant frequency of the loop or magnetic antenna 352 is based on the inductance and capacitance. Inductance may be simply the inductance created by the antenna 352, whereas, a capacitor may be added to create a resonant structure at a desired resonant frequency. As a non-limiting example, a capacitor 354 and a capacitor 356 are added to the transmit or receive circuitry 350 to create a resonant circuit that resonates at a desired frequency of operation. Accordingly, for larger diameter antennas, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 350. For transmit antennas, a signal 358, with a frequency that substantially corresponds to the resonant frequency of the antenna 352, may be an input to the antenna 352.

Figure 4:
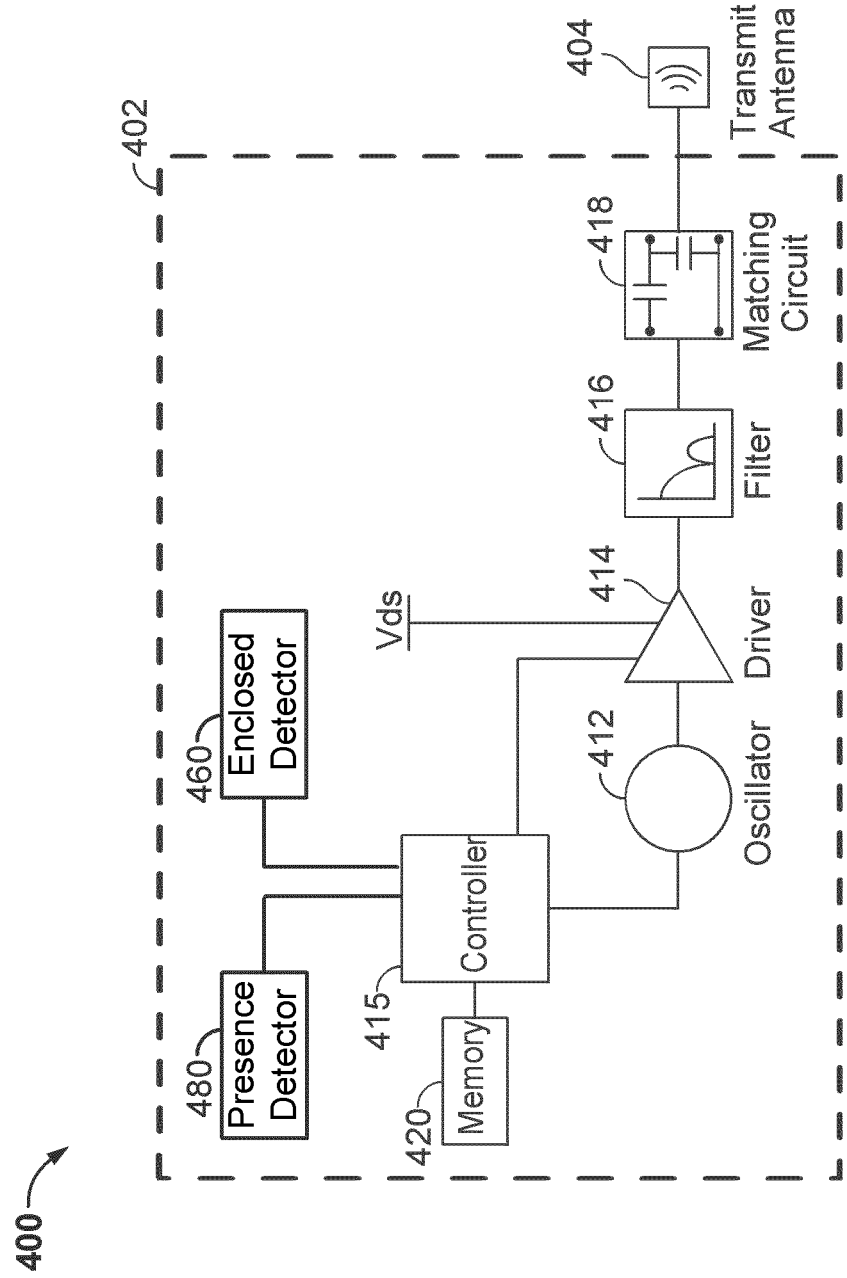
FIG. 4 is a functional block diagram of a transmitter that can be used in the wireless power transfer system of FIG. 1, in accordance with an exemplary embodiment.

FIG. 4 is a simplified functional block diagram of a transmitter 400 that may be used in an inductive power transfer system, in accordance with exemplary implementations of the invention. The transmitter 400 includes transmit circuitry 402 and a transmit antenna 404 operably coupled to the transmit circuitry 402. In some implementations, the transmit antenna 404 is configured as the transmit antenna 214 as described above in reference to FIG. 2. In some implementations, the transmit antenna 404 is or may be referred to as a coil (e.g., an induction coil). In some implementations, the transmit antenna 404 is associated with a larger structure, such as a pad, table, mat, lamp, or other stationary configuration. In some implementations, the transmit antenna 404 is configured to generate an electromagnetic or magnetic field within a charging region. In an exemplary implementation, the transmit antenna 404 is configured to transmit power to a receiver device within the charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices as described herein. As such, the transmit circuitry 402 may provide wireless power efficiently and safely.

The transmit circuitry 402 includes a controller 415. In some implementations, the controller 415 may be a microcontroller or a processor. In other implementations, the controller 415 may be implemented as an application-specific integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 further includes a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 further includes an oscillator 412 operably connected to the controller 415. In some implementations, the oscillator 412 is configured as the oscillator 222 as described above in reference to FIG. 2. The oscillator 412 may be configured to generate an oscillating signal at the operating frequency of the wireless power transfer. In some implementations, the transmit circuitry 402 is configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of charging power to the transmit antenna 404 via the signal, which may generate energy (e.g., magnetic flux) about the transmit antenna 404.

The transmit circuitry 402 further includes a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 further includes a low pass filter (LPF) 416 operably connected to the transmit antenna 404. The low pass filter 416 may be configured as the filter portion of the matching circuit 418 as described above in reference to FIG. 2. In some exemplary implementations, the low pass filter 416 may be configured to receive and filter an analog signal of current and an analog signal of voltage generated by the driver circuit 414. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specific frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 to the transmit antenna 404. Other exemplary implementations may include an adaptive impedance match that may be varied based on measurable transmit metrics, such as the measured output power to the transmit antenna 404 or a DC current of the driver circuit 414.

The transmitter 400 may need to gather and track information about the whereabouts and status of receiver devices that can be associated with the transmitter 400, or other objects present within a charging field of the transmitter 400. Thus, the transmit circuitry 402 may further include a presence detector 480, an enclosed detector 460, or a combination thereof, connected to the controller 415 (also referred to as a processor herein). The controller 415 can adjust an amount of power delivered by the driver circuit 414 in response to presence signals from the presence detector 480 and the enclosed detector 460.

As a non-limiting example, the presence detector 480 can be a motion detector utilized to sense the initial presence of a device to be charged that is inserted into the coverage area of the transmitter 400. After detection, the transmitter 400 can be turned on and the radio frequency (RF) power received by the device can be used to toggle a switch on the receiver device in a pre-determined manner, which in turn results in changes to the driving point impedance of the transmitter 400.

As another non-limiting example, the presence detector 480 can be a detector capable of detecting a large power receiving unit, for example, by detecting that a metal plate is present above a coil (described below with reference to FIGS. 11a-e) associated with the transmitter 400, or other suitable means. In some exemplary embodiments, it may be desirable to limit the range of induced voltage seen at a power receiving unit. In some cases, a wide range in the induced voltage seen by a power receiving unit, or an overcoupling of the transmitter 400 and a receiver, may be caused by an out of phase field present near or just outside of the edges of the transmit antenna 404. Accordingly, in some aspects, presence detector 480, alone or in conjunction with other components, may determine that a large metal object is present. Upon detection, presence detector 480 may provide a signal or indication to the controller 415 so that controller 415 can adjust an output of the transmit antenna 404, of an additional transmit antenna placed within an interior of transmit antenna 404 (not shown), or of the associated coils mentioned above and described below.

As a non-limiting example, the enclosed detector 460 (can also be referred to herein as an enclosed compartment detector or an enclosed space detector) can be a device such as a sense switch for determining when an enclosure is in a closed or open state. When a transmitter is in an enclosure that is in an enclosed state, a power level of the transmitter can be increased.

The transmit circuitry 402 may further comprise discrete devices, discrete circuits, and/or an integrated assembly of components.

Figure 5:
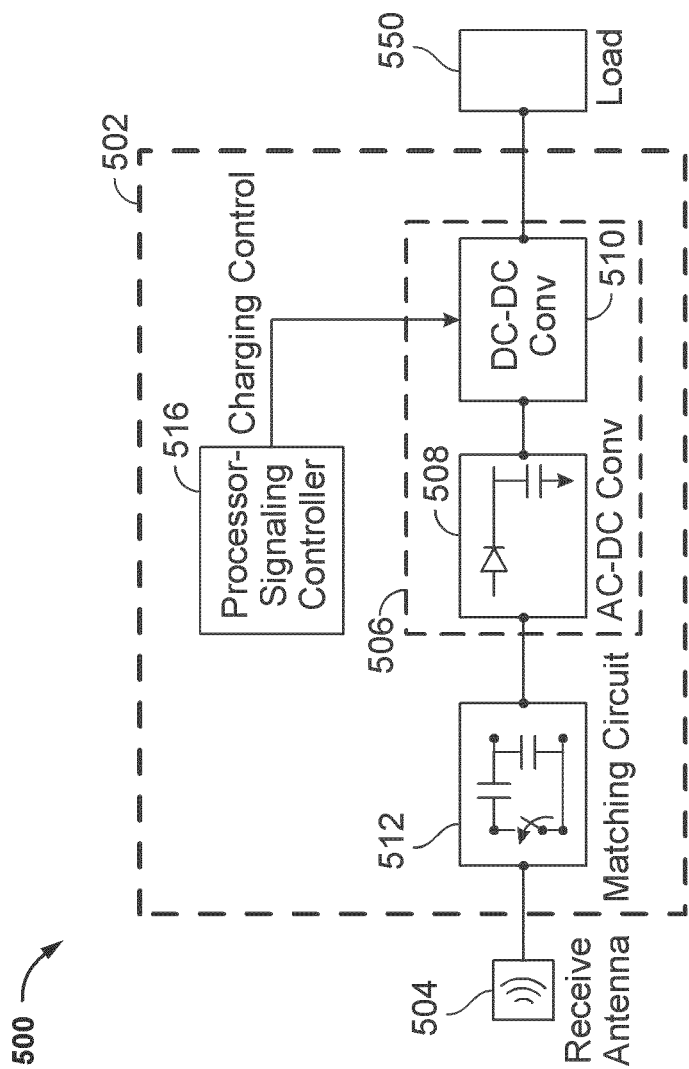
FIG. 5 is a functional block diagram of a receiver that can be used in the wireless power transfer system of FIG. 1, in accordance with an exemplary embodiment.

FIG. 5 is a block diagram of a receiver 500, in accordance with an implementation of the present invention. A receiver 500 includes a receive circuitry 502, a receive antenna 504, and a load 550. The receiver circuitry 502 is electrically coupled to the load 550 for providing received charging power thereto. It should be noted that receiver 500 is illustrated as being external to load 550 but may be integrated into load 550. The receive antenna 504 is operably connected to the receive circuitry 502. The receive antenna 504 may be configured as the receive antenna 218 as described above in reference to FIG. 2/FIG. 3. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to a magnetic field generated by the transmit antenna 404 (FIG. 4), as described above, and provide an amount of received energy to the receive circuitry 502 to power or charge the load 550.

The receive circuitry 502 is operably coupled to the receive antenna 504 and the load 550. The receive circuitry may be configured as the receive circuitry 210 as described above in reference to FIG. 2. The impedance presented to the receive antenna by the receive circuitry 502 may be configured to match an impedance of the receive antenna 504 (e.g., via the matching circuit 512) which may increase efficiency. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 includes a processor-signaling controller 516 configured to coordinate the processes of the receiver 500.

The receive circuitry 502 includes power conversion circuitry 506 for converting a received energy source into charging power for use by the load 550. The power conversion circuitry 506 includes an AC-to-DC converter 508 coupled to a DC-to-DC converter 510. The AC-to-DC converter 508 rectifies the AC from the receive antenna 504 into DC while the DC-to-DC converter 510 converts the rectified energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include switching circuitry 512 configured to connect the receive antenna 504 to the power conversion circuitry 506 or alternatively for disconnecting the power conversion circuitry 506 from the receive antenna 504. Disconnecting the receive antenna 504 from the power conversion circuitry 506 not only suspends charging of the load 550, but also changes the "load" as "seen" by the transmitter 400 of FIG. 4.

The wireless power circuitry described above, and particularly the receive circuitry 502, is intended to be incorporated into a variety of portable electronic devices. Some portable devices may have housings or other portions that are made of a variety of materials including metal.

Figure 6:
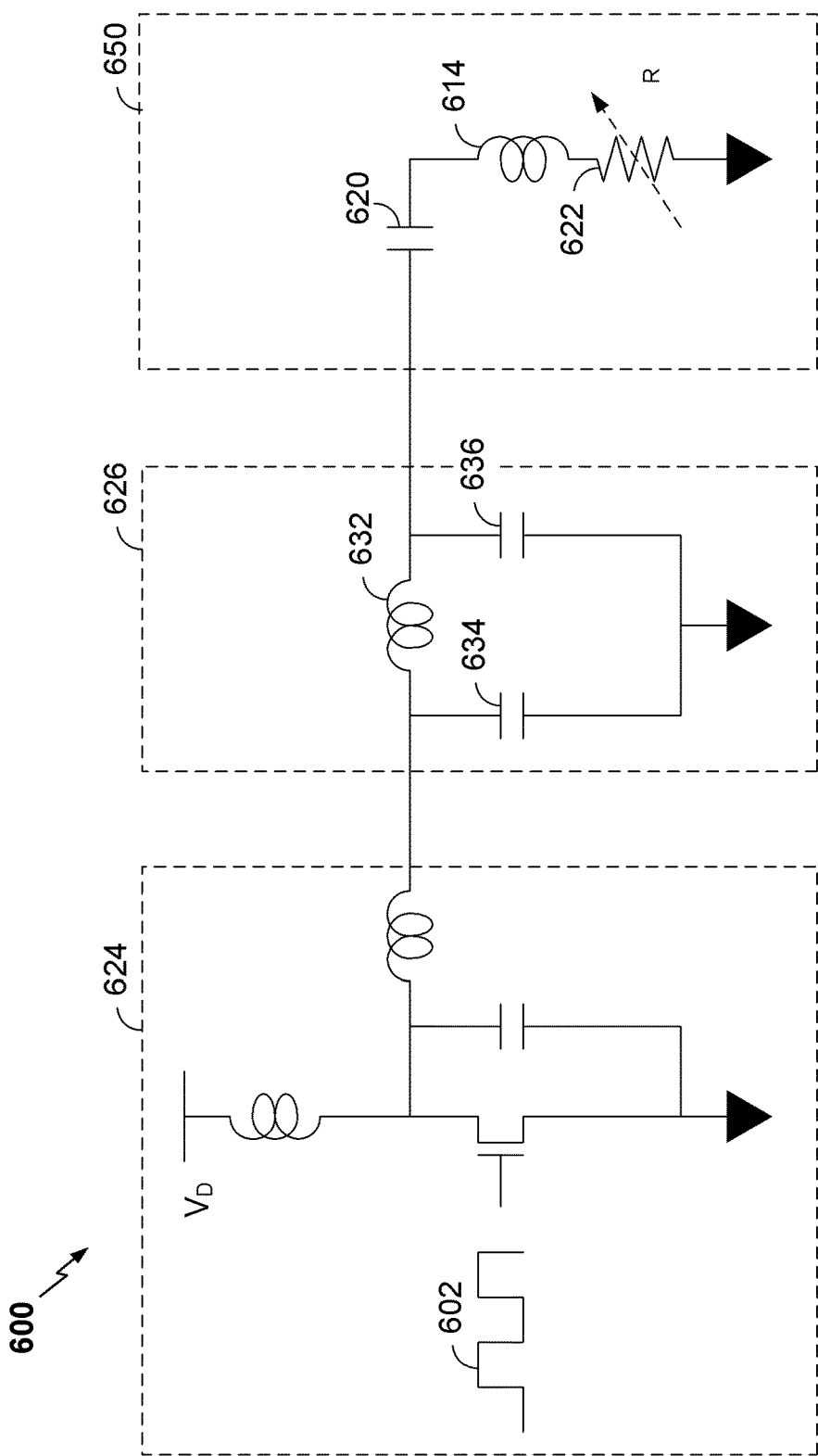
FIG. 6 is a schematic diagram of a portion of transmit circuitry that can be used in the transmitter of FIG. 4.

FIG. 6 is a schematic diagram of a portion of transmit circuitry 600 that can be used in the transmitter 400 of FIG. 4. The transmit circuitry 600 can include a driver circuit 624 as described above with respect to driver circuit 414 in FIG. 4. As described above, the driver circuit 624 can be a switching amplifier that can be configured to receive a square wave and output a sine wave to be provided to the transmit circuit 650. In some cases, the driver circuit 624 can be referred to as an amplifier circuit. The driver circuit 624 is shown as a class E amplifier; however, any suitable driver circuit 624 can be used in accordance with embodiments of the invention. The driver circuit 624 can be driven by an input signal 602 from an oscillator 412 as shown in FIG. 4. The driver circuit 624 can also be provided with a drive voltage VD that is configured to control the maximum power that can be delivered through a transmit circuit 650. To eliminate or reduce harmonics, the transmit circuitry 600 can include a filter circuit 626. In some embodiments, the filter circuit 626 can be a three pole (capacitor 634, inductor 632, and capacitor 636) low pass filter circuit 626.

The signal output by the filter circuit 626 can be provided to a transmit circuit 650 comprising a coil 614. The transmit circuit 650 can include a series resonant circuit having a capacitance 620 and inductance that can resonate at a frequency of the filtered signal provided by the driver circuit 624. In various embodiments, the coil or an additional capacitor component can create the inductance or capacitance. The load of the transmit circuit 650 can be represented by the variable resistor 622. The load can be a function of a wireless power receiver 500 that is positioned to receive power from the transmit circuit 650.

As discussed above with respect to FIG. 4, the transmitter 400 can include the presence detector 480, which can detect the presence, distance, orientation, and/or location of the nearby object. In various other embodiments, the presence detector 480 can be located in another location such as, for example, on the receiver 500, or elsewhere. The controller 415 can alter transmission power or a transmission field pattern when a large metal sheet is detected at a first position. In various embodiments, the wireless power transmission system 100 can adjust a characteristic of the wireless power transmission in accordance with the embodiments discussed herein. For example, the wireless power transmission system 100 can adjust the transmit power such that an effect of an out of phase portion of the magnetic field is mitigated. In some aspects, this mitigation may be through changing a characteristic of the out of phase portion, through shielding a power receiving unit from at least some of the out of phase portion, through increasing the power of a specific region of the transmit resonator, or some combination thereof.

Figure 7:
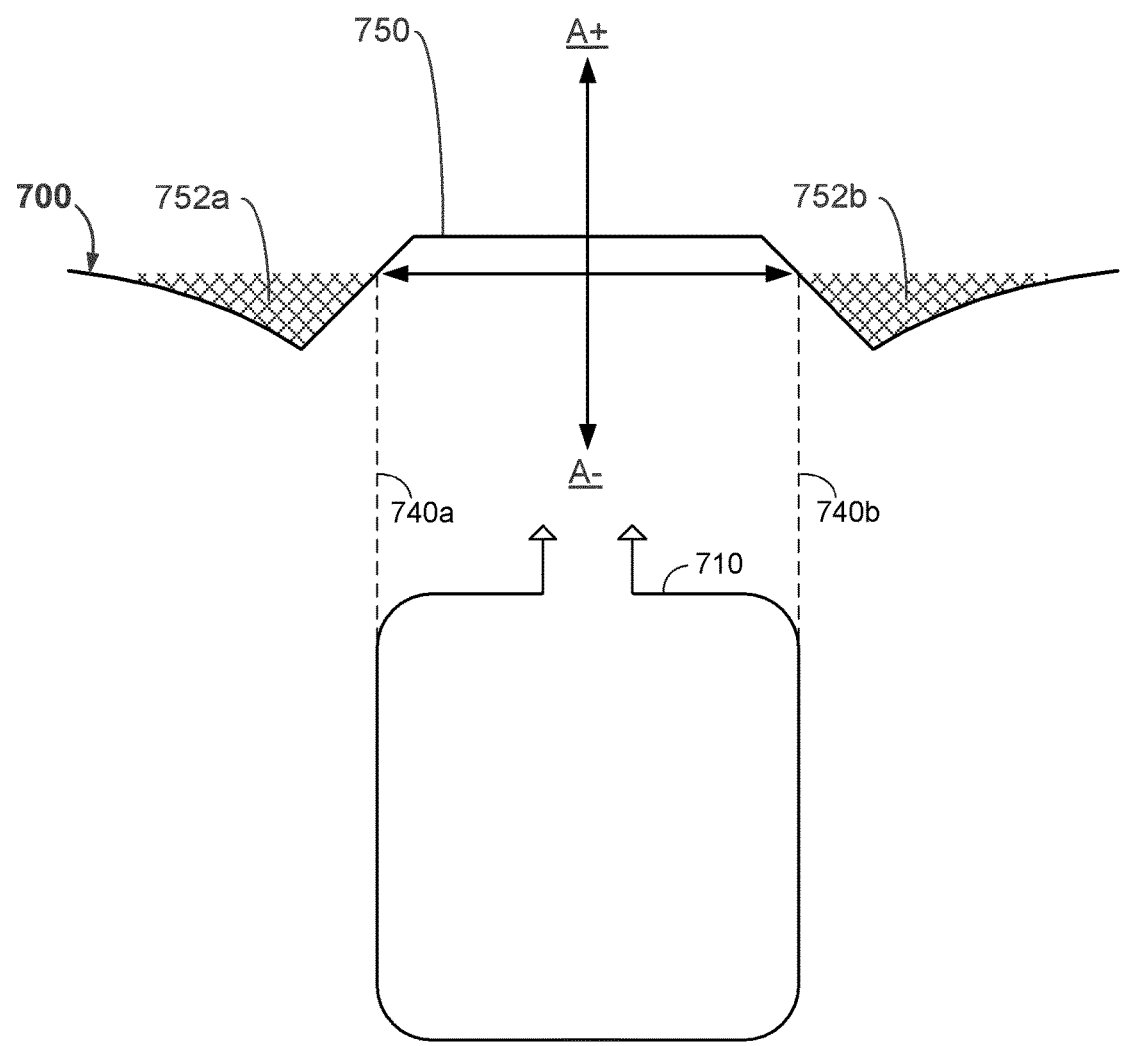
FIG. 7 depicts a theoretical plot of a magnetic field at various portions within and around a wireless power transmit coil, in accordance with an exemplary embodiment.

FIG. 7 depicts a theoretical plot a magnetic field 700 at various portions within and around a wireless power transmit coil, illustrated as power transmitting coil 710, in accordance with an exemplary embodiment. In accordance with some of the embodiments described above, power transmitting coil 710 may be configured to generate a field for charging a wireless power device, such as magnetic field 700. As shown, the generated magnetic field 700 (also referred to herein as "H-field") may comprise a linear portion 750, wherein the strength or magnitude of magnetic field 700 is substantially uniform and positive. However, closer to the boundaries or perimeter of the power transmitting coil 710, the magnitude of magnetic field 700 varies, and begins to slope downward. Substantially over the edges of power transmitting coil 710, the magnetic field 700 may be referred to as "zero-crossing," as illustrated by zero-crossing points 740*a* and 740*b*. At this point, or just outside of the perimeter of power transmitting coil 710, magnetic field 700 may reverse its phase. Once the magnetic field 700 has reversed its phase, it may be comprise an H-field component that is 180 degrees "out-of-phase" with respect to the phase of magnetic field 700 illustrated by linear portion 750. This out of phase component may be referred to as a reverse recovery area or a reversed phase field, and is illustrated by shaded portions 752*a* and 752*b*. Stated another way the phase of the magnetic field component in the linear region 750 is different than the phase of the magnetic field component in the region 752*a* and 752*b*.

This out of phase component may have undesirable impacts to large power receiving units (PRU), namely, large PRUs with metal backings. In some aspects, these "large" devices may comprise PRUs having tablet sized form factors and configured for wireless power transfer in the 30-60 Watt range, for example. In some cases, small devices (e.g., that are small enough to be placed wholly within the region 750) may not be exposed to this out of phase component, or may otherwise not be impacted by the component. The impact of the out-of phase component is discussed further with reference to FIG. 8.

Figure 8:
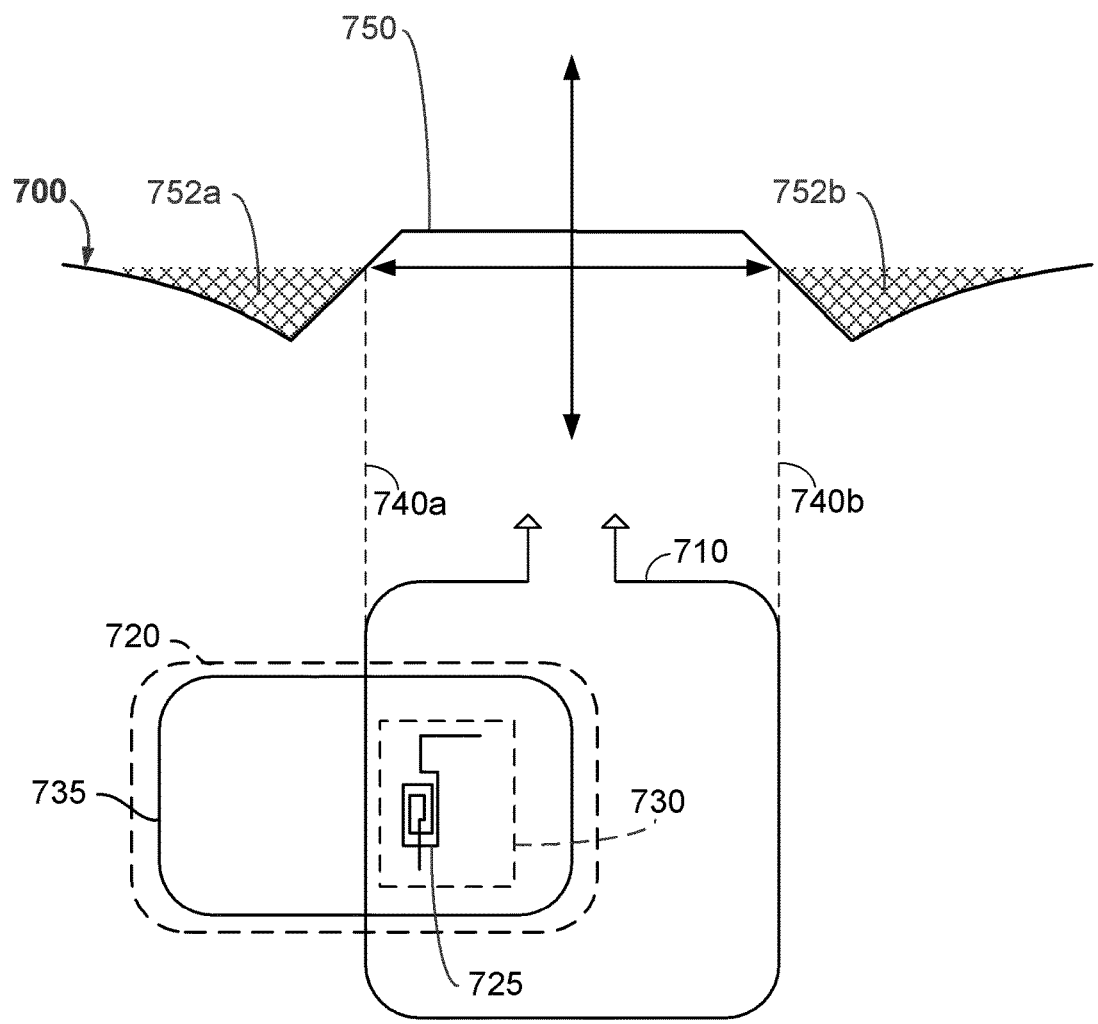
FIG. 8 depicts a wireless power receiver placed over the wireless power transmit coil of FIG. 7, in accordance with an exemplary embodiment.

FIG. 8 depicts a wireless power receiver 720 placed over the wireless power transmit coil of FIG. 7, in accordance with an exemplary embodiment. As depicted, wireless power receiver 720 comprises a metal backing 735 and receiver circuitry 730 comprising receive antenna 725. Receiver circuitry 730 may be similar to receiver circuitry 502 and receive antenna 725 may be similar to receive antenna 504 discussed above with respect to FIG. 5. As illustrated, the wireless power receiver 720 is located in a position where a portion of the wireless power receiver 720 is within the uniform H-field (i.e., over linear portion 750) and a portion of the wireless power receiver 720 is within the out-of-phase portion of the H-field (i.e., portion 752*a*).

When wireless power receiver 720 is placed in this position, the out-of-phase portion may induce opposite eddy currents in the metal backing 735, which can significantly increase the induced voltage at the wireless power receiver 720. In this case, the eddy current created in the metal exposed to the out-of-phase area generates an opposing field component in the receive antenna 725, which increases the induced voltage seen at the PRU. This increase in induced voltage may be referred to as "over coupling" of the power transmitting coil 710 and the receive antenna 725. This may be undesirable, as it may cause voltage stress on the PRU that is high enough to damage components of the PRU due to this over coupling. Accordingly, this may make circuit design difficult or expensive. This effect may also be undesirable, since the coupling may drop significantly when the wireless power receiver 720 is place in a position where the metal backing 735 is not exposed to the out-of-phase portion of the magnetic field 700. This significant drop may mean that there is a wide range between the minimum and the maximum induced voltage. This wide range may make circuit design difficult or expensive or fail to comply with certain operating constraints.

In some cases, the eddy current created in the metal exposed to the in-phase area generates an opposing field component in the receive antenna 725, which decreases the induced voltage seen at the PRU. This may be undesirable, as it may cause reduction of voltage at the receiver and consequent reduction of power coupling, which may be referred to as "under coupling" effects. These effects may also make circuit design difficult or expensive, and may be worsened by centering the receiver on the transmitter, since this placement will expose the maximum area of the metal backing to the in-phase field. This will maximize the eddy current caused by the in-phase field, and may cause an even more significant drop in voltage at the receiver.

In order to mitigate this effect, a break could be added to the metal backing 735 so that the eddy currents are reduced or eliminated. However, this may be undesirable or expensive for PRU manufacturers or undesirable to consumers. Another solution could be to add ferrite to the PRU device so that less metal is exposed to the out-of-phase portion. However, this solution may also be undesirable or expensive for PRU manufacturers.

In accordance with aspects of certain embodiments described herein, a separate structure may be added and placed close enough to power transmitting coil 710 in order to reduce or eliminate the strength or effect of the out-of-phase portion. These separate structures are explained below with respect to FIGS. 9-11.

Figure 9:
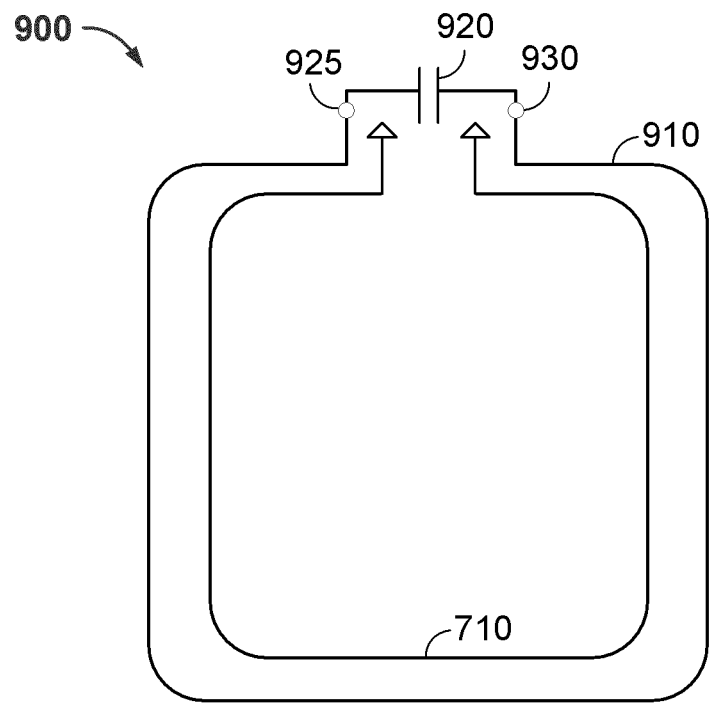
FIG. 9 depicts a schematic diagram of an exemplary coil placed outside of the transmit coil of FIG. 7, in accordance with an exemplary embodiment.

FIG. 9 depicts a schematic diagram of an exemplary wireless power transmission system 900 comprising transmit coil 710 of FIG. 7, in accordance with an exemplary embodiment. As illustrated, wireless power transmission system comprises power transmitting coil 710 surrounded, at least in part by "compensating" coil 910. Compensating coil 910 may surround at least a portion of a perimeter of the power transmitting coil 710 and be configured to reduce an out-of-phase effect of a field at the perimeter of the power transmitting coil 710. In various embodiments, compensating coil 910 may be a single loop coil wire or a multi-turn coil wholly or partially surrounding the transmitting coil 710.

In some aspects, power transmitting coil 710 may have at least one loop having an inner area inside boundaries of the loop and an outer area outside the boundaries of the loop. In various aspects, the power transmitting coil 710 may be configured to generate an alternating magnetic field for charging or powering a receiver device, such as wireless power receiver 720 of FIG. 8. The alternating magnetic field may comprise a first magnetic field component in the inner area having a first phase and a second magnetic field component in the outer area that has a second phase that is different than the first phase. In one aspect wireless power transmission system 900 comprises at least one compensating coil 910 having a portion that is within the outer area. The at least one compensating coil 910 may be configured to reduce a magnitude of the second magnetic field component generated by the power transmitting coil 710.

As illustrated, compensating coil 910 contains connectors 925 and 930 which electrically connect the compensating coil 910 to a tuning capacitor 920. In some aspects, tuning capacitor 920 may be used to form a resonant circuit comprising the compensating coil 910 and the tuning capacitor 920 and configured to resonate at a resonant frequency. The resonant frequency may be substantially the operating frequency of the power transmitting coil 710 (e.g., 6.78 MHz, in one embodiment), or may be some other frequency that is substantially near the operating frequency.

In some aspects, tuning capacitor 920 may not be present, and connectors 925 and 930 may connect or electrically couple compensating coil 910 to a driving circuit (not shown). In accordance with this aspect, the driving circuit may be configured to operatively drive the compensating coil 910 with a signal derived from the primary coil driving signal. The signal may comprise a current that is substantially similar to the current in the primary coil, or it may be attenuated. In some embodiments, it could correspond to a resonant frequency. The resonant frequency may be substantially 6.78 MHz, or may be some other frequency that is near 6.78 MHz. In some aspects, some level of tolerance in variations of the resonant frequency may be acceptable.

In one embodiment, compensating coil 910 may be electrically coupled to a controller, such as controller 415 of FIG. 4. In accordance with this embodiment, the controller may be configured to determine information indicative of a voltage at a receive coil of a wireless power device, such as receive antenna 725 of wireless power receiver 720 of FIG. 8. In some aspects, compensating coil 910 may be electrically coupled to the driving circuit described above, which may be configured to generate a frequency signal for driving the compensating coil 910 based upon the information determined by the controller or some other detector, such as presence detector 480 of FIG. 4. In some aspects, the controller 415 may also be configured to generate the driving signal based on other variables, such as the type of power receiver 720, the location of the power receiver 720 with respect to the power transmitting coil 710, a rectified voltage of the power transmitting coil 710 or compensating coil 910, an impedance present at the power transmitting coil 710 or the receive antenna 725 of the wireless power receiver 720, or some other sensed or determined information.

Compensating coil 910 may be close to power transmitting coil 710, or may be further away. In some aspects, compensating coil 910 is offset in a z-plane from power transmitting coil 710. For instance, power transmitting coil 710 may defines a first x-y plane, and the compensating coil 910 may be offset from the first x-y plane in a second x-y-plane.

In one embodiment, compensating coil 910 may be configured to generate a second field in response to an electrical current flowing in the compensating coil 910. The electrical current flowing in the compensating coil 910 may be generated in response to the field generated by the power transmitter coil 710. A voltage may be induced based on the alternating magnetic field generated by the power transmitting coil 710 which may cause an electrical current to flow through the compensating coil 910 to generate the second field. The second field may be configured to or otherwise used to reduce (e.g., partially cancel) the out-of-phase component of the field generated by the power transmitter coil 710 present at or near the perimeter of the power transmitting coil 710. Reducing the out-of-phase effect may comprise reducing the magnitude of the out-of-phase component of the magnetic field. In some aspects, the field generated by the power transmitting coil 710 and the second field generated by the compensating field are magnetic fields. One non-limiting example of a benefit of reducing the out-of-phase effect would be reducing the induced voltage at a PRU, such as power receiver 720 positioned at least partially in the out-of-phase region, which can, in turn, reduce the voltage stress on the PRU, reduce the overall range of induced voltage seen by the PRU, and simplify or reduce the costs of PRU design. Another potential benefit would be an increase in the induced voltage at a PRU, such as power receiver 720, which can, in turn, increase the power coupled to the PRU. These benefits may, in turn, allow larger PRUs to be introduced into a wireless power ecosystem.

Figure 10:
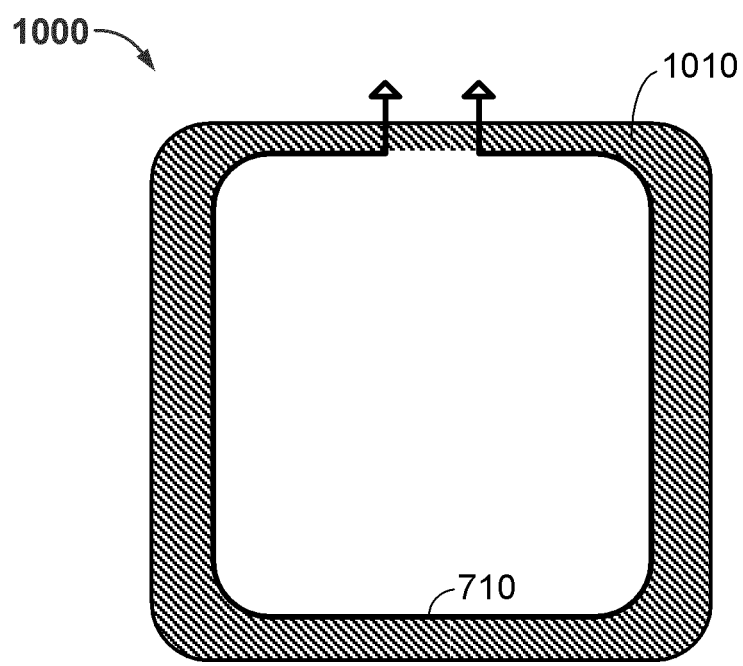
FIG. 10 depicts a schematic diagram of an exemplary shielding portion used in conjunction with the transmit coil of FIG. 7, in accordance with an exemplary embodiment.

FIG. 10 depicts a schematic diagram of an exemplary wireless power transmission system 1000 comprising transmit coil 710 of FIG. 7, in accordance with an exemplary embodiment. As illustrated, wireless power transmission system 1000 comprises power transmitting coil 710 surrounded, at least in part by shielding portion 1010. As described above, power transmitting coil 710 may be configured to generate a field for charging a wireless power device, such as wireless power receiver 720 of FIG. 8. Shielding portion 1010 may surround at least a portion of a perimeter of the power transmitting coil 710 and be configured to reduce an out-of-phase effect of a field at the perimeter of the power transmitting coil 710. In some aspects, shielding portion 1010 may overlap with portions of power transmitting coil, and may be present within or over the interior portion formed by the power transmitting coil 710. In various embodiments, power transmitting coil 710 may be a single loop coil wire or antenna. In some aspects, shielding portion 1010 comprises a metal or ferrite material. In various aspects, the field comprises a magnetic field.

Reducing the out-of-phase effect of the field at the perimeter of the power transmitting coil 710 may comprise, in some aspects, shielding a wireless power device, such as wireless power receiver 720 of FIG. 8, from the out-of-phase effect of the field at the perimeter of the power transmitting coil 710. In some aspects, shielding the wireless power device from the out-of-phase effect of the field may comprise reducing a magnitude of the out-of-phase magnetic field at the perimeter of the power transmitting coil 710.

In one embodiment, shielding portion 1010 comprises a metal or ferrite portion comprising one or more portions of a contiguous loop surrounding the perimeter of the power transmitting coil 710, wherein the one or more portions are separated by a space or a slit. In other embodiments, shielding portion 1010 comprises a metal or ferrite portion forming a contiguous loop surrounding the perimeter of the power transmitting coil.

FIG. 11a depicts a schematic diagram of an exemplary detection or mitigation system 1100a comprising a transmit coil 710a, in accordance with an exemplary embodiment. As illustrated, detection or mitigation system 1100a comprises a power transmitting coil 710a and a plurality of coils 1105, 1110, 1115, and 1120 positioned outside of the power transmitting coil 710a. As depicted, each of the plurality of coils 1105-1120 are smaller in size than the power transmitting coil 710a. However, in other embodiments, each of the plurality of coils 1105-1120 may be equal to or larger in size than the power transmitting coil 710a. Power transmitting coil 710a may be similar to power transmitting coil 710 of FIG. 7. In various aspects, power transmitting coil 710a is configured to generate a primary field for charging a wireless power device. In some aspects, the plurality of coils 1105-1120 are configured to reduce an out-of-phase effect of the primary field at a perimeter of the power transmitting coil 710a.

In one aspect, reducing the out-of-phase effect of the primary field comprises generating a secondary field via the plurality of coils 1105-1120. In one embodiment, reducing the out-of-phase effect of the primary field (e.g., via generating the secondary field) may be in response to detecting a presence of a device, such as a PRU, over at least one of the plurality of coils 1105-1120. In this embodiment, detecting the presence of the device may comprise gathering information from a component, such as presence detector 480 of FIG. 4. In various aspects, each of the primary and secondary fields comprise a magnetic field. In one embodiment, this secondary field may be in phase with the primary field. In one aspect, the secondary field is different (e.g., lower or higher) in magnitude than the primary field. The smaller fields may tend to oppose/cancel the out-of-phase field components.

When charging a wireless device, such as a PRU, users may be more prone to place the device within the center of a power transmitter unit (PTU) (e.g., that may generally correspond to the region around the center of the power transmitting coil 710a), such as a charging pad comprising a centrally located power transmitting coil 710a. However, larger PRUs, as described above, may not function properly when they are centrally located. For example, similar to the descriptions above, placing a PRU with a receiving antenna in the center of a power transmitting coil may, in turn, involve placing a portion of the PRU (e.g., the body of the PRU, or a metal backing therein) in the out-of-phase portion of the magnetic field generated by the PTU. The portion of the PRU placed in the out-of-phase portion may be significant, which may increase the problems described herein.

In accord, in one embodiment, detection or mitigation system 1100a may comprise a controller, such as controller 415 of FIG. 4. The controller 415 may be configured to detect that a device is present over at least one of the plurality of coils 1105-1120. In one embodiment, detecting that the device is present may utilize presence detector 480 or FIG. 4. In some aspects, the detected device may be a PRU with a large metal plate or backing. In accordance with these aspects, reducing the out-of-phase effect of the primary field may comprise increasing a magnitude of the primary field in a central area of the power transmitting coil 710a based upon detecting the presence of the device. Methods of increasing the magnitude of the primary field in a central area of a power transmitting coil may be implemented in a variety of different ways and comprise one or more additional power transmitting coils located within an interior region of the power transmitting coil 710a, for example. Methods of increasing the magnitude of the primary field may additionally or alternatively involve increasing the current in the power transmitting coil 710a. As one non-limiting example, this may allow a user to place a PRU in the center of a PTU, to achieve a more efficient coupling thereof.

FIG. 11b depicts a schematic diagram of another exemplary detection or mitigation system 1100b comprising a power transmitting coil 710b, in accordance with an exemplary embodiment. As illustrated, detection or mitigation system 1100b comprises a power transmitting coil 710b and a plurality of coils 1125, 1130, and 1135 positioned outside of the power transmitting coil 710b. Power transmitting coil 710b may be similar to power transmitting coil 710 of FIG. 7 or power transmitting coil 710a of FIG. 11a. However, as illustrated, power transmitting coil 710b comprises a loop coil antenna in a circular shape, rather than a square or rectangular shape. Accordingly, in one embodiment, detection or mitigation system 1100*b* includes three coils 1125-1135 spaced approximately equal about power transmitting coil 710*b*, rather than four. However, one of skill in the art would appreciate that only three coils may be necessary in detection or mitigation system 1100*a*, depending upon design constraints and other desires, such as those of an end-user. One of skill in the art would also appreciate that any number of coils, or the size thereof, may vary based upon these constraints and desires. Further, one of skill in the art would appreciate that the various embodiments disclosed herein, such as those discussed above with respect to FIG. 11*a*, may apply equally to other transmit coil shapes with little or no modification.

FIG. 11*c* depicts a schematic diagram of another exemplary detection or mitigation system 1100*c* used in conjunction with a power receiving unit 720, in accordance with an exemplary embodiment. Similar to the discussion above with respect to FIGS. 7 and 11*a*, users may place wireless power receiver 720 offset from the center of a power transmitting coil 710*a*. Accordingly, in one embodiment, detection or mitigation system 1100*c* may comprise a controller, such as controller 415 of FIG. 4, that may be configured to detect a change in impedance of each of the plurality of coils 1105-1120. This detection may be utilized in order to detect that a device is present over at least one of the plurality of coils 1105-1120. In some aspects, the detected device may be a wireless power receiver 720 with a large metal plate or backing. In accordance with this embodiment, reducing the out-of-phase effect of the primary field can comprise generating a secondary field via at least a portion of the plurality of coils 1105-1120 in which the change in impedance is detected. For example, the secondary field may only be generated in each of the individual plurality of coils 1105-1120 in which a change in impedance is detected. In other embodiments, the plurality of coils 1105-1120 may constantly generate the secondary field, and in some aspects, the detection or mitigation system 1100*c* may not comprise a controller. In other embodiments, the controller (if present) may not increase the magnitude of the primary field in a central area of the power transmitting coil if a limited number of coils detect the overlap, indicating a reduced need for compensation of reverse-phase coupling to the metal backing. Further, the generated secondary field may also be used to provide at least a portion of the wireless power to wireless power receiver 720.

FIG. 11*d* depicts a schematic diagram of another exemplary detection or mitigation system 1100*d* used in conjunction with a power receiving unit, in accordance with an exemplary embodiment. As illustrated, detection or mitigation system 1100*d* comprises a centrally located wireless power receiver 720. Accordingly, similar to detection or mitigation system 1100*c* of FIG. 11*c*, all four of the illustrated plurality of coils 1105-1120 may be activated by a controller. In one aspect, the plurality of coils 1105-1120 may generate a secondary field that reduces the effects of an out-of-phase field at a perimeter of the power transmitting coil 710*a*, and further provides a wireless power charging field for wireless power receiver 720. In other embodiments, the controller (if present) may increase the magnitude of the primary field in a central area of the power transmitting coil if a significant number of coils detect the overlap, indicating an increased need for compensation of reverse-phase coupling to the metal backing.

Figure 11E:
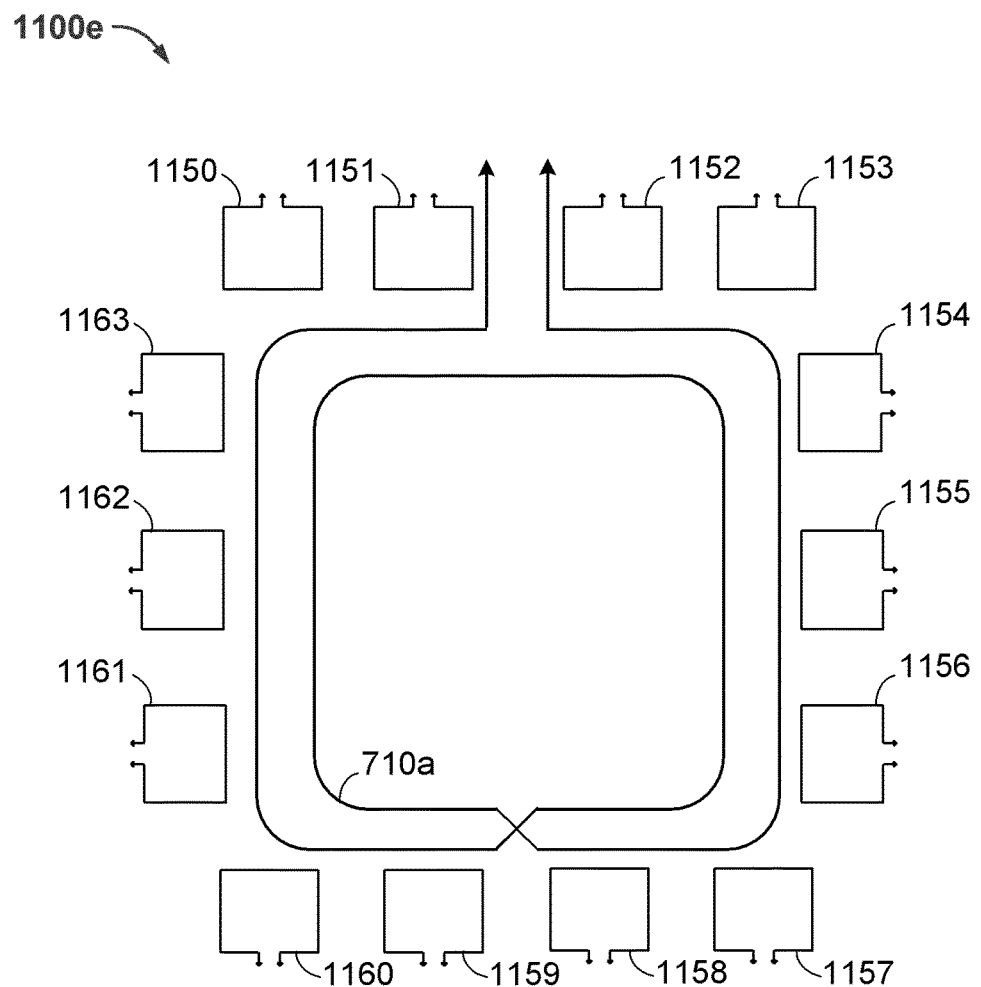
FIG. 11e depicts a schematic diagram of an exemplary detection or mitigation system comprising a transmit coil, in accordance with an exemplary embodiment.

FIG. 11*e* depicts a schematic diagram of an exemplary detection or mitigation system 1100*e* comprising a transmit coil, in accordance with an exemplary embodiment. As illustrated, detection or mitigation system 1100*e* comprises a power transmitting coil 710*a* and a plurality of coils 1150-1163 positioned outside of the power transmitting coil 710*a*. As illustrated, the plurality of coils 1150-1163 substantially surround power transmitting coil 710*a*. One of skill in the art would appreciate that less or more coils may be used in detection or mitigation system 1100*e*, depending upon design constraints and other desires, such as those of an end-user. As a non-limiting example, one benefit of having coils substantially surround the perimeter of the power transmitting coil 710*a* may be that, in addition to reducing the out-of-phase effect of the power transmitting coil 710*a*, the power charging field available for a PRU may also be extended.

Figure 12:
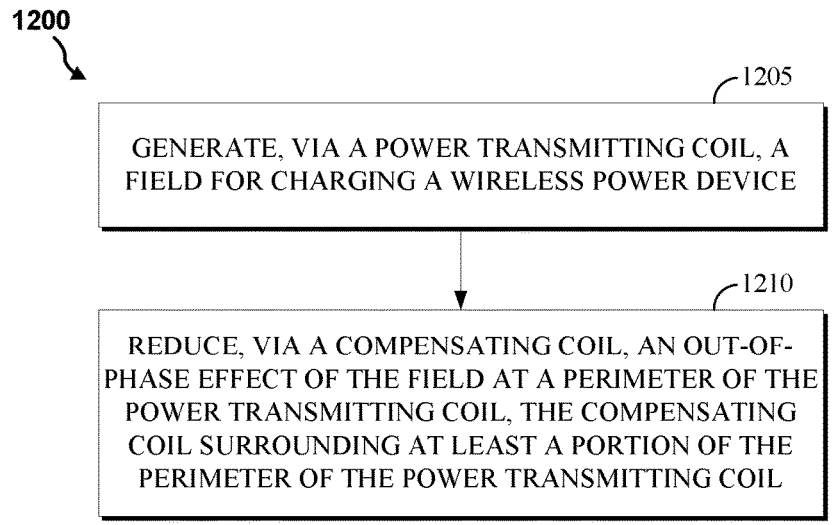
FIG. 12 is a flowchart of an exemplary method of providing wireless power, in accordance with an exemplary embodiment.

FIG. 12 is a flowchart of an exemplary method 1200 of providing wireless power, in accordance with an exemplary embodiment. Although method 1200 is described herein with reference to the wireless power transmission system 100 discussed above with respect to FIGS. 1-2, the transmitter 400 discussed above with respect to FIG. 4, and the wireless power transmission system 900 discussed above with respect to FIG. 9, in some embodiments, method 1200 may be implemented by another device described herein, or any other suitable device. In some embodiments, the blocks of method 1200 may be performed by a processor or controller, such as, for example, the controller 415 (referenced in FIG. 4). Although method 1200 is described herein with reference to a particular order, in various embodiments, blocks herein can be performed in a different order, or omitted, and additional blocks may be added.

At block 1205, a power transmitting coil (such as power transmitting coil 710, 710*a*, or 710*b*) generates a field for charging a wireless power device. At block 1210, a compensating coil (such as compensating coil 910) reduces an out-of-phase effect of the field at a perimeter of the power transmitting coil, the compensating coil surrounding at least a portion of the perimeter of the power transmitting coil. In some aspects, the compensating coil comprises a single loop of wire. In some aspects, the power transmitting coil defines a first x-y plane, and wherein the compensating coil is offset from the first x-y plane in a second x-y-plane. In various aspects, the field comprises a magnetic field and the out-of-phase effect of the field is a reversed phase (or reverse recovery) field.

In an aspect of an embodiment, the compensating coil can generate a second field in response to an electrical current flowing in the compensating coil, the electrical field generated in response to the field generated by the power transmitter coil, and the second field configured to reduce the out-of-phase effect of the field at the perimeter of the power transmitting coil.

In some aspects, the compensating coil may resonate at a resonant frequency. In various aspects, this may be achieved in part by electrically coupling a tuning capacitor to the compensating coil to form a resonant circuit. In some aspects, the resonant frequency is substantially 6.78 MHz. Additionally or alternatively, a driving circuit may operatively drive the compensating coil with a signal at a resonant frequency. In some aspects, this may be achieved in part by electrically coupling the compensating coil to the driving circuit. In some aspects, the resonant frequency is substantially 6.78 MHz. In various embodiments, method 1200 may involve determining information indicative of a voltage at a receive coil of the wireless power device. In accordance with these embodiments, the driving circuit may generate the resonant frequency based upon the determined information.

Figure 13:
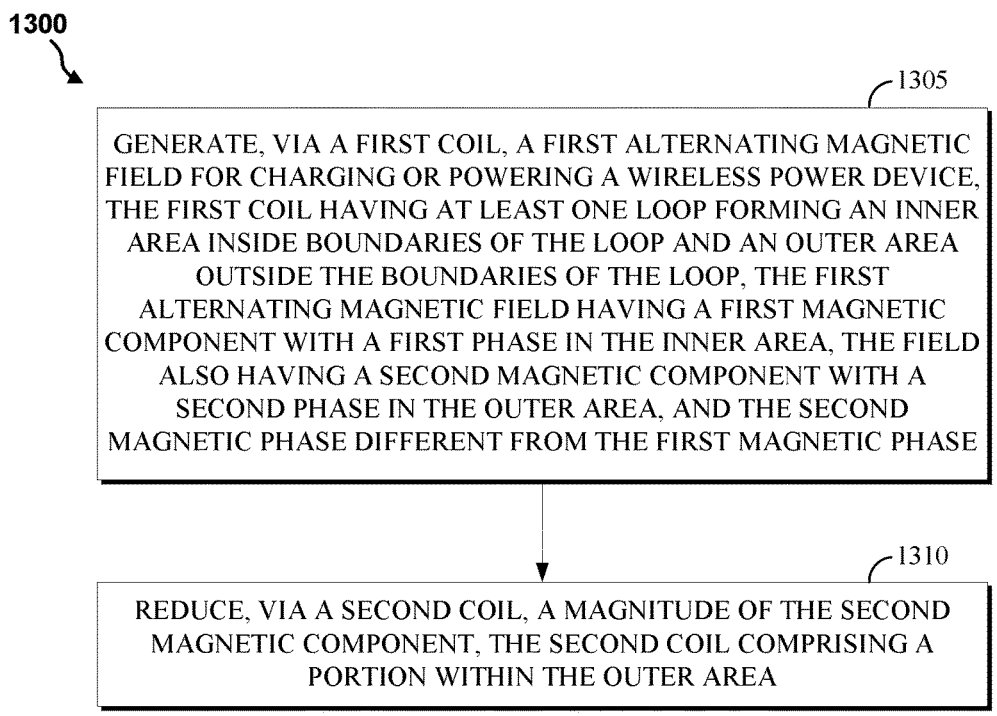
FIG. 13 is a flowchart of an exemplary method of providing wireless power, in accordance with an exemplary embodiment.

FIG. 13 is a flowchart of an exemplary method 1300 of providing wireless power, in accordance with an exemplary embodiment. Although method 1300 is described herein with reference to the wireless power transmission system 100 discussed above with respect to FIGS. 1-2, the transmitter 400 discussed above with respect to FIG. 4, and the wireless power transmission system 900 discussed above with respect to FIG. 9, in some embodiments, method 1300 may be implemented by another device described herein, or any other suitable device. In some embodiments, the blocks of method 1300 may be performed by a processor or controller, such as, for example, the controller 415 (referenced in FIG. 4). Although method 1300 is described herein with reference to a particular order, in various embodiments, blocks herein can be performed in a different order, or omitted, and additional blocks may be added.

At block 1305, a first coil (such as power transmitting coil 710, 710a, or 710b) is utilized to generate a first alternating magnetic field for charging or powering a wireless power device, the first coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second magnetic phase different from the first magnetic phase.

At block 1310, a second coil (such as compensating coil 910) is utilized to reduce a magnitude of the second magnetic field component, the second coil comprising a portion within the outer area. In an embodiment, reducing the magnitude of the second magnetic field component comprises operatively driving the second coil with a signal, via a driving circuit. In a related embodiment, the driving circuit may operatively drive the second coil with the signal at a resonant frequency. In an aspect of an embodiment, information indicative of a voltage at a receive coil of the wireless power device may be determined. Based upon the determined information, the signal for operatively driving the second coil via the driving circuit may be generated. In some aspects, the second coil comprises a single loop of wire. In some aspects, the first coil defines a first x-y plane, and wherein the second coil is offset from the first x-y plane in a second x-y-plane. In various aspects, the second magnetic field component comprises a reversed phase (or reverse recovery) field.

In an aspect of an embodiment, a first resonant circuit comprising the first coil may resonate at a resonant frequency, and a second resonant circuit comprising the second coil may resonate substantially at the resonant frequency of the first resonant circuit. In some aspects, the resonant frequency is substantially 6.78 MHz.

In some aspects, the second coil can generate a second magnetic field that opposes the second magnetic field component having the second phase in order to reduce the magnitude of the second magnetic field component having the second phase. In various aspects, the second alternating magnetic field is generated in response to an electrical current flowing through the second coil, the electrical current flowing in response to a voltage induced in the second coil, the voltage induced based on the first alternating magnetic field.

In an aspect of an embodiment, the method may comprise reducing a magnitude of the second magnetic field component via a plurality of coils positioned in the outer area. In an embodiment, the plurality of coils comprises the second coil. In one embodiment, the method comprises determining a position of the wireless power device based on a coupling of the wireless power device and at least a portion of the plurality of coils. In accordance with this embodiment, one or more of the plurality of coils may be selectively activated, based in part on the determined position, to reduce the magnitude of the second magnetic field component FIG. 14 is a flowchart of an exemplary method 1400 of providing wireless power, in accordance with an exemplary embodiment. Although method 1400 is described herein with reference to the wireless power transmission system 100 discussed above with respect to FIGS. 1-2, the transmitter 400 discussed above with respect to FIG. 4, and the wireless power transmission system 1000 discussed above with respect to FIG. 10, in some embodiments, method 1400 may be implemented by another device described herein, or any other suitable device. In some embodiments, the blocks of method 1400 may be performed by a processor or controller, such as, for example, the controller 415 (referenced in FIG. 4). Although method 1400 is described herein with reference to a particular order, in various embodiments, blocks herein can be performed in a different order, or omitted, and additional blocks may be added.

At block 1405, a power transmitting coil (such as power transmitting coil 710, 710a, or 710b) generates a first alternating magnetic field for charging or powering a wireless power device, the power transmitting coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second magnetic phase different from the first magnetic phase. At block 1410, a metal or ferrite portion (such as shielding portion 1010) shields the wireless power device from the second magnetic field component, the metal or ferrite portion surrounding at least a portion of the perimeter of the power transmitting coil. In some aspects, the metal or ferrite portion comprises one or more portions of a contiguous loop surrounding the perimeter of the power transmitting coil, the one or more portions separated by a space. In other aspects, the metal or ferrite portion forms a contiguous loop surrounding the perimeter of the power transmitting coil.

In various aspects, the second magnetic field component comprises a reversed phase (or reverse recovery) field. In some aspects, shielding the wireless power receiver device from the second magnetic field component comprises reducing a magnitude of the second magnetic field component.

FIG. 15 is a flowchart of an exemplary method 1500 of providing wireless power, in accordance with an exemplary embodiment. Although method 1500 is described herein with reference to the wireless power transmission system 100 discussed above with respect to FIGS. 1-2, the transmitter 400 discussed above with respect to FIG. 4, and the wireless power transmission systems 1100a-e discussed above with respect to FIGS. 11a-e, in some embodiments, method 1500 may be implemented by another device described herein, or any other suitable device. In some embodiments, the blocks of method 1500 may be performed by a processor, a controller, or a detector, such as, for example, the controller 415 or the presence detector 480 (referenced in FIG. 4). Although method 1500 is described herein with reference to a particular order, in various embodiments, blocks herein can be performed in a different order, or omitted, and additional blocks may be added.

At block 1505, a power transmitting coil (such as power transmitting coil 710, 710*a*, or 710*b*) generates a first alternating magnetic field for charging or powering a wireless power device, the power transmitting coil having at least one loop forming an inner area inside boundaries of the at least one loop and an outer area outside the boundaries of the at least one loop, the first alternating magnetic field having a first magnetic field component with a first phase in the inner area, the first alternating magnetic field also having a second magnetic field component with a second phase in the outer area, and the second magnetic phase different from the first magnetic phase. At block 1510, a plurality of coils (such as coils 910) positioned outside of the power transmitting coil reduce a magnitude of the second magnetic field component. In some aspects, reducing the magnitude of the second magnetic field component comprises generating a second alternating magnetic field via the plurality of coils. In some aspects, the second alternating magnetic field is in phase with the first alternating magnetic field. In some aspects, the second alternating magnetic field is lower in magnitude than the first alternating magnetic field. In some aspects, each of the plurality of coils are smaller in size than the power transmitting coil. In some aspects, the plurality of coils substantially surround the perimeter of the power transmitting coil. In various aspects, the second magnetic field component is a reversed phase (or reverse recovery) field.

In an aspect of an embodiment, method 1500 may include detecting that a device is present over at least one of the plurality of coils, and reducing the magnitude of the second magnetic field component may comprise increasing a magnitude of the first magnetic field component (e.g., in a central area of the power transmitting coil) based upon detecting the presence of the device. Additionally or alternatively, in some aspects, method 1500 may include detecting a change in impedance of each of the plurality of coils, and reducing the magnitude of the second magnetic field component may comprise generating a second alternating magnetic field via at least a portion of the plurality of coils in which the change in impedance is detected.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations. For instance, in various aspects, means for generating a field (e.g., a primary field) for charging a wireless power device may comprise a transmitting coil, such as transmit antenna 404 or any one of power transmitting coils 710, 710*a*, or 710*b*, or their functional equivalents, as described herein. In various aspects, means for reducing an out-of-phase effect (e.g., of the field for charging a wireless power device) may comprise compensating coil 910, shielding portion 1010, or any one of the plurality of coils 1105-1120, 1125-1135, or 1150-1163, or their functional equivalents, as described herein. In various embodiments, means for generating a second field can comprise compensating coil 910 or any one of the plurality of coils 1105-1120, 1125-1135, or 1150-1163, or their functional equivalents. In one embodiment, the means for resonating may comprise tuning capacitor 920, a resonant circuit comprising tuning capacitor 920 and compensating coil 910, driver circuit 414, a resonant circuit comprising driver circuit 414 and compensating coil 910, or their functional equivalents.

In some aspects, means for operatively driving may comprise driver circuit 414, a resonant circuit comprising driver circuit 414 and compensating coil 910, or their functional equivalents. In one aspect, means for determining information indicative of a voltage may comprise controller 415, presence detector 480, enclosed detector 460, transmit antenna 404, their functional equivalents, or some combination thereof. In one embodiment, means for generating the resonant frequency based upon the determined information may comprise controller 415, compensating coil 910, tuning capacitor 920, transmit antenna 404, power transmitting coils 710, 710*a*, or 710*b*, or their functional equivalents, or some combination thereof. In some aspects, means for detecting that a device is present may comprise controller 415, presence detector 480, enclosed detector 460, transmit antenna 404, their functional equivalents, or some combination thereof. In one embodiment, means for increasing a magnitude of the primary field can comprise transmit antenna 404, power transmitting coils 710, 710*a*, or 710*b*, an additional coil placed (e.g., a transmit coil) within a charging area of one of the power transmitting coils 710, 710*a*, or 710*b* (e.g., within an interior portion thereof), or their functional equivalents, or some combination thereof. In some aspects, means for detecting a change in impedance may comprise controller 415, presence detector 480, enclosed detector 460, transmit antenna 404, their functional equivalents, or some combination thereof. In one aspect, means for generating a secondary field may comprise controller 415, any one of the plurality of coils 1105-1120, 1125-1135, or 1150-1163, their functional equivalents, or some combination thereof.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for providing wireless power, comprising:
   a first coil having at least one loop forming an inner area inside a perimeter of the at least one loop and an outer area outside the perimeter of the at least one loop, the first coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second phase different from the first phase; and
   a second coil surrounding at least a portion of the perimeter of the at least one loop, the second coil configured to reduce a magnitude of the second magnetic field component.

2. The apparatus of claim 1, wherein the first coil defines a first x-y plane, and wherein the second coil comprises a single loop of wire offset from the first x-y plane in a second x-y plane.

3. The apparatus of claim 1, wherein the second coil is configured to generate a second alternating magnetic field that opposes the second magnetic field component in order to reduce the magnitude of the second magnetic field component.

4. The apparatus of claim 3, wherein the second alternating magnetic field is generated in response to an electrical current flowing through the second coil, the electrical current flowing in response to a voltage induced in the second coil, the voltage induced based on the first alternating magnetic field.

5. The apparatus of claim 1, further comprising:
   a first resonant circuit comprising the first coil and configured to resonate at a resonant frequency; and
   a second resonant circuit comprising the second coil and configured to resonate substantially at the resonant frequency of the first resonant circuit.

6. The apparatus of claim 5, wherein the resonant frequency of the first resonant circuit is substantially 6.78 MHz.

7. The apparatus of claim 1, wherein the second coil is electrically coupled to a driving circuit configured to operatively drive the second coil with a signal to reduce the magnitude of the second magnetic field component.

8. The apparatus of claim 7, wherein the driving circuit is further configured to operatively drive the second coil with the signal at a resonant frequency of a resonant circuit comprising the second coil, the resonant circuit configured to be resonant at the resonant frequency.

9. The apparatus of claim 7, further comprising:
   a controller configured to determine information indicative of a voltage at a receive coil of the wireless power device, wherein the driving circuit is configured to generate the signal for operatively driving the second coil based upon the determined information.

10. The apparatus of claim 1, further comprising:
    a plurality of coils positioned in the outer area, the plurality of coils configured to reduce the magnitude of the second magnetic field component and comprising the second coil.

11. The apparatus of claim 10, further comprising:
    a controller configured to:
      determine a position of the wireless power device based on a coupling of the wireless power device and at least a portion of the plurality of coils, and
      selectively activate one or more of the plurality of coils, based in part on the determined position, to reduce the magnitude of the second magnetic field component.

12. The apparatus of claim 1, wherein the second magnetic field component comprises a reversed phase field.

13. A method for providing wireless power, comprising:
    generating, via a first coil, a first alternating magnetic field for charging or powering a wireless power device, the first coil having at least one loop forming an inner area inside a perimeter of the at least one loop and an outer area outside the perimeter of the at least one loop, the first alternating magnetic field having a first magnetic field component with a first phase in the inner area, the first alternating magnetic field also having a second magnetic field component with a second phase in the outer area, and the second phase different from the first phase; and
    reducing, via a second coil, a magnitude of the second magnetic field component, the second coil surrounding at least a portion of the perimeter of the at least one loop.

14. The method of claim 13, wherein the first coil defines a first x-y plane, and wherein the second coil comprises a single loop of wire offset from the first x-y plane in a second x-y-plane.

15. The method of claim 13, wherein reducing the magnitude of the second magnetic field component comprises:
generating, by the second coil, a second alternating magnetic field that opposes the second magnetic field component.

16. The method of claim 15, wherein the second alternating magnetic field is generated in response to an electrical current flowing through the second coil, the electrical current flowing in response to a voltage induced in the second coil, the voltage induced based on the first alternating magnetic field.

17. The method of claim 13, further comprising:
resonating, by a first resonant circuit, at a resonant frequency, the first resonant circuit comprising the first coil; and
resonating, by a second resonant circuit, substantially at the resonant frequency of the first resonant circuit, the second resonant circuit comprising the second coil.

18. The method of claim 17, wherein the resonant frequency of the first resonant circuit is substantially 6.78 MHz.

19. The method of claim 13, wherein reducing the magnitude of the second magnetic field component comprises operatively driving the second coil with a signal, via a driving circuit.

20. The method of claim 19, further comprising:
operatively driving the second coil with the signal at a resonant frequency via the driving circuit.

21. The method of claim 19, further comprising:
determining information indicative of a voltage at a receive coil of the wireless power device; and
generating the signal for operatively driving the second coil via the driving circuit, based upon the determined information.

22. The method of claim 13, wherein the second magnetic field component comprises a reversed phase field.

23. An apparatus for providing wireless power, comprising:
first means for generating a first alternating magnetic field for charging or powering a wireless power device, the first generating means having an inner area inside a perimeter of the first generating means and an outer area outside the perimeter, the first alternating magnetic field having a first magnetic field component with a first phase in the inner area, the first alternating magnetic field also having a second magnetic field component with a second phase in the outer area, and the second phase different from the first phase; and
means for reducing a magnitude of the second magnetic field component, the reducing means surrounding at least a portion of the perimeter.

24. The apparatus of claim 23, wherein the means for reducing the magnitude of the second magnetic field component comprises:
second means for generating a second alternating magnetic field that opposes the second magnetic field component.

25. The apparatus of claim 24, wherein the second alternating magnetic field is generated in response to an electrical current flowing through the reducing means, the electrical current flowing in response to a voltage induced in the reducing means, the voltage induced based on the first alternating magnetic field.

26. The apparatus of claim 23, further comprising:
first resonating means for resonating at a resonant frequency, the first resonating means comprising the first generating means; and
second means for resonating substantially at the resonant frequency of the first resonating means, the second resonating means comprising the reducing means.

27. An apparatus for providing wireless power, comprising:
a first coil having at least one loop forming an inner area inside boundaries of the at least one loop and an outer area outside the boundaries of the at least one loop, the first coil configured to generate a first alternating magnetic field for charging or powering a wireless power device, the first alternating magnetic field having a first magnetic field component with a first phase in the inner area, the first alternating magnetic field also having a second magnetic field component with a second phase in the outer area, and the second phase different from the first phase; and
a second coil comprising a portion within the outer area, the second coil configured to reduce a magnitude of the second magnetic field component,
wherein the second coil is configured to generate, in response to an electrical current flowing through the second coil, a second alternating magnetic field that opposes the second magnetic field component in order to reduce the magnitude of the second magnetic field component, the electrical current flowing in response to a voltage induced in the second coil based on the first alternating magnetic field.

28. The apparatus of claim 27, wherein the first coil defines a first x-y plane, and wherein the second coil comprises a single loop of wire offset from the first x-y plane in a second x-y-plane.

29. The apparatus of claim 27, wherein the second coil is electrically coupled to a driving circuit configured to operatively drive the second coil with a signal to reduce the magnitude of the second magnetic field component.

30. The apparatus of claim 27, further comprising:
a first resonant circuit comprising the first coil and configured to resonate at a resonant frequency; and
a second resonant circuit comprising the second coil and configured to resonate substantially at the resonant frequency of the first resonant circuit.

* * * * *